United States Patent [19]

Masterson

[11] 4,254,959

[45] Mar. 10, 1981

[54] PHONOGRAPH TONE ARM CONTROL SYSTEM

[75] Inventor: Earl E. Masterson, Minneapolis, Minn.

[73] Assignee: Masterson Engineering Inc., St. Louis Park, Minn.

[21] Appl. No.: 52,731

[22] Filed: Jun. 28, 1979

[51] Int. Cl.³ .............................................. G11B 17/06
[52] U.S. Cl. ...................................... 369/41; 369/55; 369/219; 369/231; 369/134
[58] Field of Search .................... 274/23 All, 131, 415

[56] References Cited

U.S. PATENT DOCUMENTS

| 4,087,095 | 5/1978 | Koda | 274/23 A |
| 4,138,121 | 2/1979 | Nakajima et al. | 274/23 R |

FOREIGN PATENT DOCUMENTS 2740734  3/1978  Fed. Rep. of Germany ........ 274/23 A

*Primary Examiner*—Charles E. Phillips
*Attorney, Agent, or Firm*—Charles G. Mersereau

[57] ABSTRACT

A multi-function phonograph tone arm control system for a low-friction air bearing supported linear-travelling tone arm system is disclosed. Positive horizontal linear positioning is accomplished by means of an electromagnetic force producing system in which opposing linear forces may be balanced at any point along the path of straight-line travel of the tone arm to position the tone at any desired location. A separate electromagnetic force producing system is utilized to control the vertical pivoting of the tone arm including the pressure of the stylus on a phonograph record. A further motion damping means is provided to stabilize the motion of the tone arm and prevent any unwanted vibration of the tone arm. A means for automatically shutting off the system at the end of a record is also provided.

36 Claims, 5 Drawing Figures

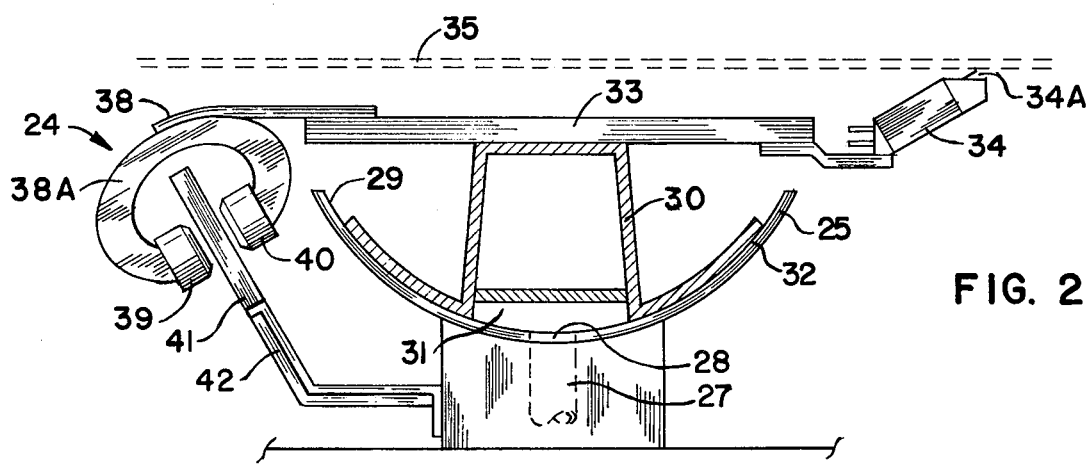
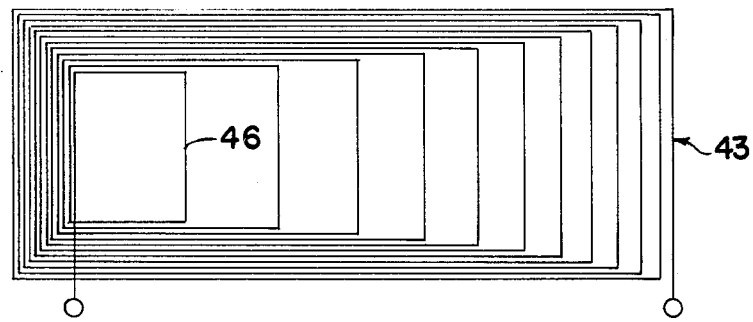
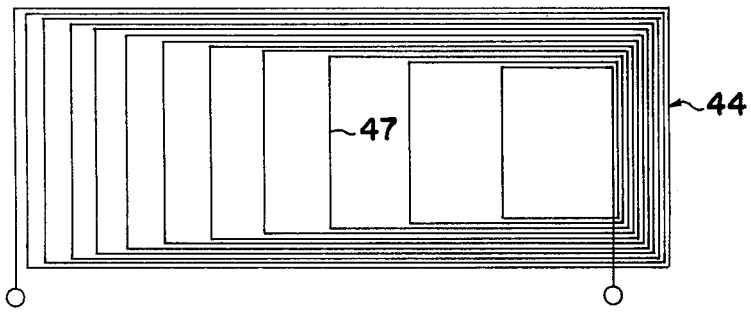
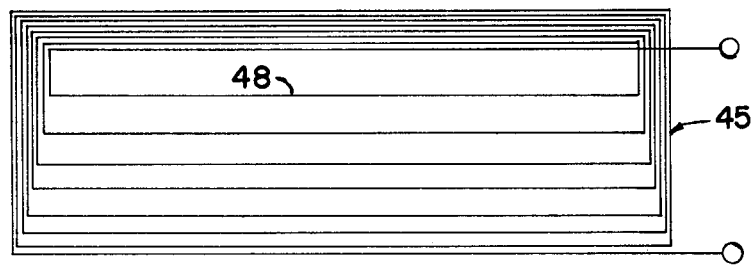
FIG. 2
FIG. 3
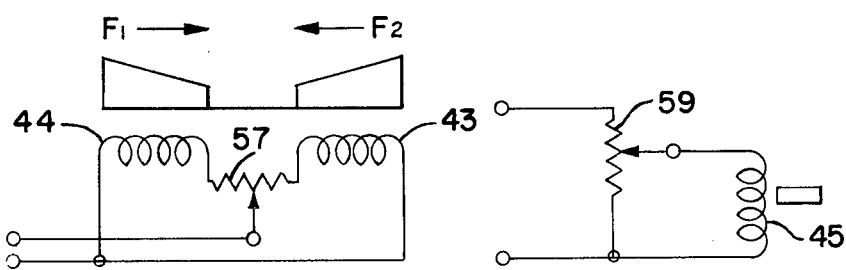
FIG. 5

PHONOGRAPH TONE ARM CONTROL SYSTEM

CROSS REFERENCE TO RELATED APPLICATION

Reference is made to a copending application of Earl E. Masterson, the inventor in this application, Ser. No. 052,730, filed of even date and assigned to the same assignee as the present application. That application entitled "Phonograph Tone Arm System" is directed to a low friction, air-bearing supported straight-line travelling tone arm system in which the tone arm is supported by air supplied to a plenum chamber support system. The present invention, on the other hand, is directed to a control system for controlling the positioning and movement of such a low friction tone arm including the stylus pressure.

BACKGROUND OF THE INVENTION

1. Field of the Invention

The present invention relates generally to the field of phonograph sound reproduction and, more particularly, to the electromagnetic control of low-friction straight-line tone arms in a phonograph.

2. Description of the Prior Art

The advantages of utilizing radial or linear tone arms rather than pivotal tone arms in the audio reproduction of phonograph records is well documented. The master records from which the copies are pressed are produced by a cutter which describes a spiral groove by moving in a radial path with respect to the center of the record as the master is rotated at constant speed. Thus, the most accurate subsequent reproduction by a phonograph occurs where the stylus also moves radially with respect to the center of the record, i.e., with the axis of the tone arm perpetually tangent to the grooves. In addition, it is desirable that the tone arm, and thus the stylus, be as free to move radially as possible so as it precisely follows the groove. If the tone arm tends to "skate" inward toward the center of the record or tends to "drag" toward the outside, serious audio distortions and/or excessive record wear may result from the failure of the stylus to properly center in the groove.

It is also an established fact that both the records themselves and the turntables on which they are mounted, in rotating, do not describe a perfectly flat path. Records often become warped and rotating turntables often have undesirable wobbles. In the face of these problems, in order to prevent audio distortions, it is desirable that the stylus of the phonograph maintain a fairly constant pressure on the record groove. In addition to eratic over reaction of the tone arm to instabilities in the record surface, low frequency vibrations may be set up in the tone arm due to system feedback which also causes distortion in the reproduced sound.

From the above it may readily be seen that the most advantageous tone arm would be one which addresses the groove in a radial manner without side pressure and having a stylus which applies approximately constant, control pressure to the groove and does not suffer from unwanted, undamped vibrations.

In the prior art many attempts have been made to solve some or all of the above audio reproduction problems utilizing a variety of mechanical schemes. For example, many types of stylus pressure controlling devices have been used and grease-filled dashpots have been used to smooth out tone arm vibrations. A variety of spring loading and other mechanical schemes have been used to overcome skating and drag problems. Most of these schemes have met with only partial success.

Noting the limitations of mechanical control, the more recent prior art contains several attempts to control tone arm and stylus forces during the playing of a record electrically. One such apparatus is shown in a patent to Rabinow, U.S. Pat. No. 3,830,505 issued on Aug. 20, 1974. That patent illustrates and describes a system which uses arm positioning sensor coils in conjunction with an electric motor to control the stylus force. Another such system is shown in U.S. Pat. No. 3,623,734 to Sakamoto et al., issued Nov. 30, 1971. A magnetic damping system is shown in a patent to Haddy, U.S. Pat. No. 3,366,382 issued Jan. 30, 1968. Most of these systems require the monitoring and processing of feedback signals to achieve any control.

As cited in applicant's above-referenced, co-pending application, several attempts have also been made to produce linear tracking radial tone arms. The means for controlling these prior art radial tone arms have been cumbersome and ineffective. It thus appears, that it would be very desirable to combine the advantages of a very low friction radial tone arm with a simple, but accurate and repeatable tone arm control system.

SUMMARY OF THE INVENTION

By means of the present invention complete tone arm position and stylus pressure control is achieved in a low friction linear travelling radial tone arm system through the use of a unique electromagnetic control system. One portion of the control system includes a position control subsystem for applying and modulating an electromagnetic force on the tone arm in either direction along its linear path of travel. Opposing forces capable of being precisely, reproducibly balanced at any point along the path of travel are used such that the tone arm may be positively positioned at any desired point. The control system further includes a modulated pivot control which electromagnetically positively controls the vertical pivoting motion of the tone arm including the stylus pressure. Dynamic damping of both the linear and pivotal motion of the tonearm may also be achieved.

The preferred embodiment contemplates a pair of spaced magnetic field producing means which may be either permanent or electromagnets which define a gap in which a pair of electrically conductive coils are disposed. The coils are such that one coil has an increasing turn density directed toward one end of the linear travel path and the other coil has an increasing turn density toward the other end of said travel path. Current applied to one coil produces a force in one linear direction and current applied to the other coil produces a force in the other linear direction. The electric current is proportionately applied to both the coils through a variable proportioning device such as a variable resistor. The net linear force on the tone arm produced by the two coils may be varied in either direction balanced at any point along the path of travel. Thus the tone arm may be positively positioned at any point along the path of travel. The system in effect has the characteristics of a balanced linear motor. Another coil disposed at right angles to the positioning coils similarly produces a controlled vertical force which is counterbalanced by the unbalanced portion of the moment of the tone arm.

Current readings or the like are readily presented as front panel positioning and stylus pressure readings.

Modulation of the power in the vertical force coil allows one to vary the stylus pressure at will even during the playing of a record. An interlock may be provided to deactivate the linear positioning system when the record is being played to assure free linear tracking.

In the preferred embodiment the coils are wound about a non-magnetic conductor which, in conjunction with the magnets produces dynamic damping of the tone arm.

BRIEF DESCRIPTION OF THE DRAWINGS

In the drawings wherein like numerals are utilized to designate like parts throughout the same:

FIG. 2 is a partial side elevational view of a tone arm in accordance with the invention;

FIG. 3 is an enlarged view of the coils of FIG. 2;

FIG. 5 is a schematic representation of the coils of FIG. 3.

DESCRIPTION OF THE PREFERRED EMBODIMENTS

Figure 1:
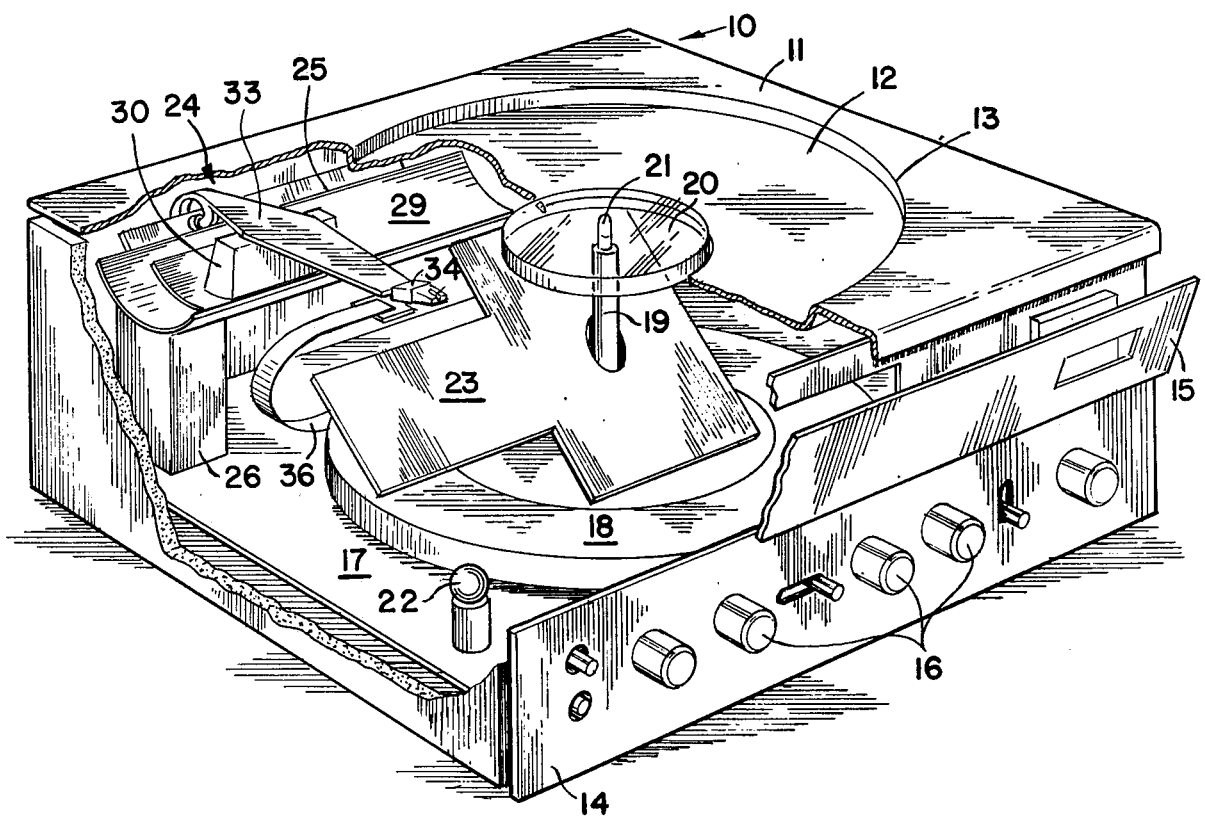
FIG. 1 is a perspective view with parts cut away showing a phonograph utilizing the invention.

In FIG. 1 there is pictured a perspective view of a phonograph equipped in accordance with the invention. The phonograph, shown generally at 10, is one which has been modified from the conventional form so that the underside of the phonograph records may be played rather than the upper surface. The cabinet has an upper member 11 which may be recessed as at 12 to receive phonograph records and at 13 to provide finger recesses to facilitate the addition and removal of records (not shown). Conventional side and rear members and a front panel 14 having a hinged section 15 are shown. An assortment of conventional control knobs, as at 16, are provided.

A chassis support member is shown at 17. A conventional turntable drive member 18 is shown having an extended spindle shaft 19 which is, in turn connected to a transparent turntable 20. A record spindle is provided at 21, an interior light at 22 and a mirror at 23.

A preferred embodiment of a low friction, linear travelling pickup tone arm in accordance with the invention shown generally at 24 in FIGS. 1 and 2. The system includes a lower support 25 having a chassis mounting section 26 and a fluid inlet 27, with opening 28. The upper surface 29 of the lower support 25 is in the shape of a concave circular trough segment much like the inside of a hollow right circular cylinder segment. A floating member 30 is provided which has a recess or plenum 31 formed in its lower surface and open to its underside. The peripheral surface 32 of the recess or plenum 31 is also circular in shape and designed to match the shape of the juxtaposed surface 29 of the support 25 as shown. A tone arm 33 carrying a pickup 34 with stylus 34a is fixed to the floating member 30.

The support 25 is mounted on the chassis support 17 such that the axis of the circular cylinder described in part by the surface 29 is normally horizontal and parallel to a radial line drawn from the center of the record spindle 21 to the outside edge of a phonograph record mounted thereon. The plane of the circular cylinder axis is shown in phantom at 35 and is preferably coincident with the normal plane of the lower surface of a phonograph record to be played. The tone arm 33 is preferably mounted so that its axis is perpendicular to that of the cylindrical support 25 so that the stylus 34a of the pickup 34 describes a radial path across a record as the member 30 travels axially along the member 25.

As mentioned above, the embodiment of FIGS. 1 and 2 is one designed to play the underside of a phonograph record. A conventional turntable drive may be slightly modified to elevate the driven turntable 20. An opening (not shown) is provided in the member 12 and the turntable 20 is made of a reduced diameter so that the pickoff may be made from the underside by the pickup 34. The internal light 22 in conjunction with the mirror 23 and hinged front panel section 15 allow the position of the stylus to be observed on the underside of the record from without the phonograph. In addition, the turntable 20 is preferably transparent so that the label of the underside of the record may be read in similar fashion. The reverse side of the hinged front panel member may also be mirrored so that observations may be made from above. The two mirror "periscope" serves to give a correct image such that the printing reads correctly, left to right.

As shown at 36 the electrical connection for the pickup may use a light extremely thin, flexible multiconductor ribbon which adds little or no horizontal force to the tone arm as the ribbon literally rolls along with the tone arm. The member 30 is floated on the member 25 in the manner of an air bearing utilizing air supplied from a pump system to the reservoir or plenum 31 via conduit 27 and opening 28.

The parts for the tone arm embodiment shown in FIGS. 1 and 2 may be constructed of any conventional materials such as metal or moldable plastic. The matching juxtaposed surfaces 29 and 32 should be relatively smooth and closely matched so that both longitudinal motion and free vertical rotational motion of the member 30 are nowhere inhibited and the amount of air escaping is minimized by the coresponding reduction in required clearance. Of course, light weight materials such as molded plastics are preferred for the floating member 30 and tone arm 33 as they are fluid supported and lighter materials require less air pressure.

The tone arm system including the air supply system is described in greater detail in applicant's above-referenced co-pending application and such description to the extent necessary is deemed incorporated by reference. Some general description of its operation will be helpful to the present application and is, thus, included here, however. When not in operation the floating member 30 rests on the corresponding support member 25. When a pump motor 37 (FIG. 5) is energized, pressurized air is introduced as through the opening 28. The pumping system may include an accumulator such that the air is maintained at a constant pressure just sufficient to cause free flotation of the floating member 30. The recess or plenum 31 should be of such a length that the corresponding air inlet or openings 28 remain beneath the hollow confines of the chamber throughout the traverse of a phonograph record by the tone arm and stylus.

The preferred embodiment of the control system of the present invention contemplates an essentially frictionless fluid supported, straight-line tone arm system such as that described. Without control, the tone arm describes uninhibited linear displacement in either direction and free vertical pivoting. This, of course, represents a long sought-after goal in the tone arm art. By means of the control system of the present invention the unique simplified control of such a tone arm is achieved without the sacrifice of any of these attributes.

There is shown in FIG. 2 a counterbalancing system for the tone arm 33 of the invention fixed thereto as by a member 38. The system contains a member 38a upon which are mounted two permanent magnets 39 and 40 having opposed poles directed toward each other and defining a fixed gap therebetween. A member 41 supporting a plurality of coils is disposed in the gap approximately midway between the poles of the magnets 39 and 40. The member 41 is suitably fixed to the chassis members 17 as by a member shown in part at 42. The system is arranged so that as the member 30 traverses the length of the member 25 the magnets 39 and 40 remain substantially the same distance from the coil bearing member 41 as they travel relative to it. The size and the weight of the magnet assembly is chosen so as to provide static counterbalancing of the tone arm 33. The actual weight of the magnet assembly should be slightly less than that required to balance the tone arm such that the stylus will not contact the underside of the record when the system is in the off or completely static mode.

The coils mounted on member 41 are shown in greater detail in FIG. 3. A pair of linear positioning coils 43 and 44 along with a vertical pivot actuating coil 45 are included. The coils are represented generally as enlarged 3-dimentional representations which include representations of top, side and bottom edges. Coil 43 contains numerous vertical turns as at 46 which increase in density proceeding from left to right. Coil 44, likewise contains a series of vertical turns 47 which increase in density proceeding from right to left. Coil 45 has a series of horizontal turns as at 48 which may increase in density proceeding from top to bottom. The basic system including the two permanent magnets 39 and 40 in conjunction with coils 43-45 in member 41 can be utilized to provide simple precise and complete control of the tone arm 33 in a manner described below in connection with FIGS. 4 and 5. The coils 43 and 44 are of a length greater than the travel of the tone arm 33 and the coil 45 is of a height greater than the normal pivoting travel of the tone arm so that the return wires at the edges of the member 41 do not interfere with the operation of the positioning and pivoting control system.

Figure 4:
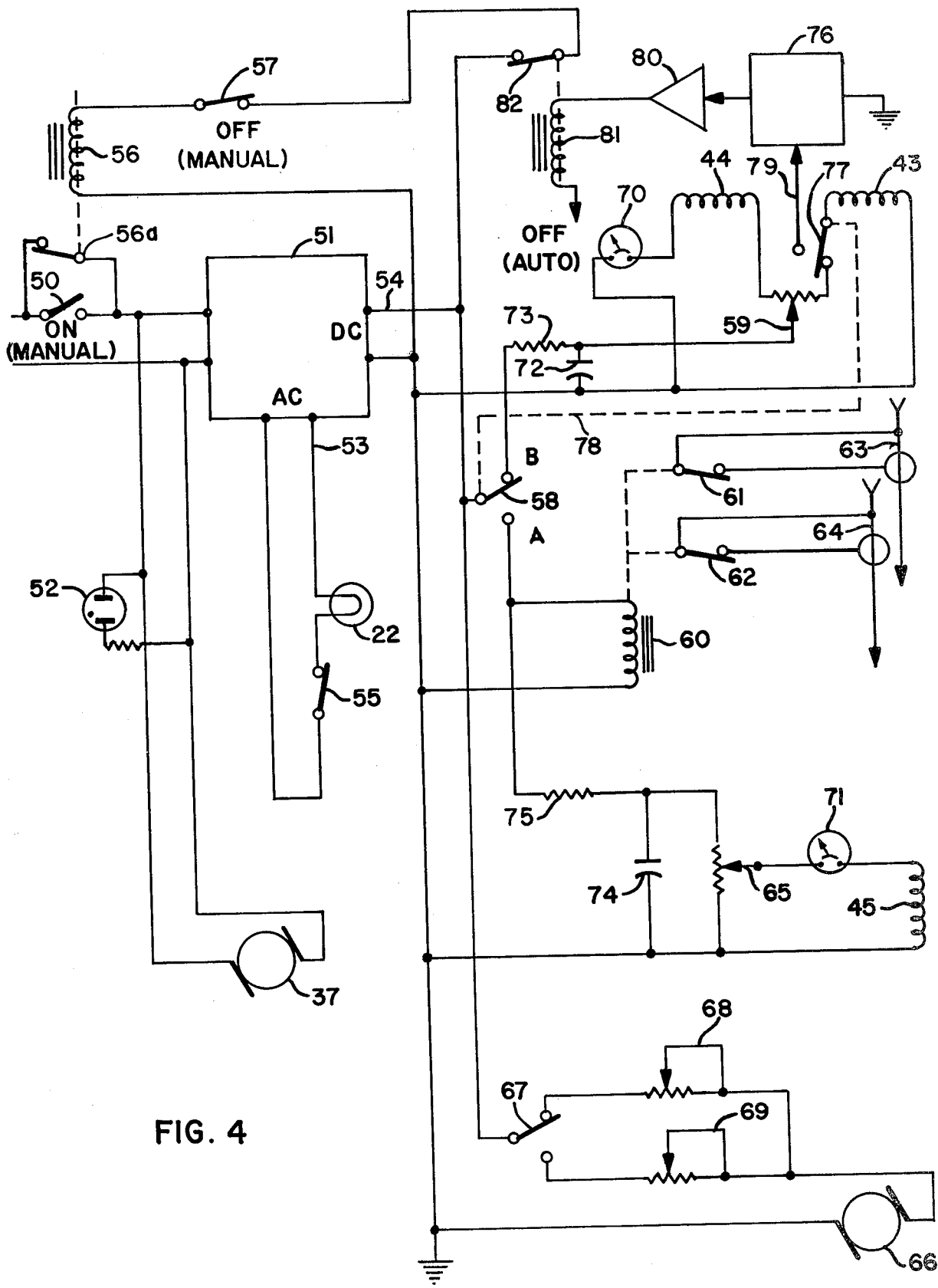
FIG. 4 is a schematic wiring diagram of the control system of the invention.

In FIG. 4 there is shown an electrical schematic diagram of the tone arm control system of the invention. This includes a main "power-on" switch 50 which connects line voltage to an internal system power source 51, strobe light 52 which may be utilized in adjusting the speed of the phonograph system turntable and air pump motor 37. The power source 51 may be any suitable conventional power source having both low voltage AC and low voltage DC outputs as at 53 and 54. The low voltage AC output is utilized to operate the internal light 22 (shown in FIG. 1) in conjunction with a switch 55 which is operated by the hinge section 15 (FIG. 1) such that when the hinge section 15 is opened, the light 22 is illuminated for reading labels and generally seeing internal of the structure.

The DC power supply 50 supplies power to a holding relay 56 which includes contacts 56a to maintain the circuit while the system is operating. A manual "off" switch 57 is also provided which, when opened, drops out the relay 56 opening contacts 56a. The DC power supply output 54 through a switch 58 in the "B" position also supplies power through a variable resistor or other current dividing device 59 supplies power to coils 43 and 44. In the "A" position switch 58 supplies power to a muting relay 60 which is utilized to operate contacts 61 and 62 in left and right signal pickup lines 63 and 64, respectively, which are held open when relay 60 is energized and to coil 45 through a variable resistor or other current dividing device 65. Power is also supplied to a turntable motor 66. Speed selection for the turntable motor 66 is supplied by a switch 67 and speed adjusting potentiometers are provided at 68 and 69 to fine tune the turntable speed either in the 33⅓ or 45 RPM modes. This may be done in conjunction with the strobe light 52 in a well known manner. Readout means are provided at 70 and 71 such that the devices 59 and 65 may be modulated by means of knobs on the front panel of the phonograph such that the position and/or stylus force of the system may be conveniently adjusted therefrom.

In operation, the coils 43 and 44 operating in conjunction with the variable resistor 59 are used to positively position the tone arm 33 at any point along its path of travel in its trough support. As previously mentioned, these coils have vertical conductors or turns in the region of the flux path of magnets 39 and 40. The coils are shaded, i.e., the density of the turns increases toward the opposite ends of the coils. When a voltage is applied to the coils, the current direction is such that the interaction between the current in the conductors and the magnetic flux of the magnets 39 and 40 produces center directed forces $F_1$ and $F_2$ as schematically shown in FIG. 5 in proportion to the ampere turns produced at the point along the coils adjacent to the magnets. Thus, the member 30 carrying the tone arm 33 will be driven linearly or axially to a position where the opposing forces are equal and dynamic stability is restored. If more current is introduced to one of the two coils, the member 30 and thus tone arm 3 will be positioned at a point in which the coil carrying the lesser current has a greater number of proximate turns such that the opposing forces are equalized in the well known manner of electromagnetic force production. Of course, by utilizing a current readout device such as that shown at 70 in conjunction with the modulation of the variable resistor 59 the member 30 carrying the tone arm 33 can be positively set positioned at any desired point along its length of travel simply by turning a modulating dial. In addition, the member 30 and the tone arm 33 will return to the preset position whenever the position of the tone arm is disturbed.

Similarly, by modulating the variable resistor 65 coil 45 can be utilized in conjunction with meter 71 and a suitable adjusting knob to adjust the vertical position and the stylus force of the pickup 34. In fact, the dial of the meter 71 can be graduated directly in units of force of the stylus on a groove. In fact, by means of this system the force of the stylus on the record can readily be changed or modulated while the record is actually being played.

Switch 58 is provided in the system to prevent the unwanted linear motion or any side directed force on the tone arm 33 while the record is being played and conversely to make sure that the stylus does not contact the record while the tone arm is being positioned. When the positioning system is de-energized, the member 30 and, consequently, the tone arm 33 are no longer subjected to the opposing linear forces and the tone arm is therefore free to follow the record groove without any inhibition in linear travel.

Conventional delay circuits may be used to allow the balanced force to remain on the tone arm to assure that it remains in position until the stylus is properly contacting the record groove. This may be accomplished through the use of a capacitor 72 operating in conjunction with resistor 73 along with a capacitor 74 operating in conjunction with resistor 75.

It should be noted in regard to the coils 43–45 that only the turns utilized to produce the force are wrapped about the face of the member 41 and the return wires are wrapped about the edges to prevent counterbalancing of the linear force produced by wires on the opposite side of the member 41. Also, as previously mentioned, the length of travel of the member 30 must be shorter than the length of coils 43 and 44 such that the coil edges do not interfere with the operation of the system as these, of course, will interfere with operation of the system.

A muting relay is provided to cut off the signals from the pickup line 63 and 64 during the time when the tone arm carriage 30 of the system is being positioned by the coils 43 and 44. This prevents unwanted noise from reverberating through the speakers in the unlikely event that the stylus strikes the record in being positioned. The pump motor drive is a conventional AC motor and the turntable motor drive including the method of adjusting the speed in connection with the strobe light 52 and adjustments 62 and 63 are well known and need not be discussed in detail here.

The member 41 is preferably made of a non-magnetic electrically conductive material such that the motion of the magnets 39 and 40 relatively to that material will produce conventional eddy currents therein whether this motion be either vertical or horizontal. This results in automatic dynamic mechanical damping of both the vertical and horizontal motion of the member 30 as any motion of the member 30 produces a corresponding relative motion between the magnets 39 and 40 and the electrically conducting non-magnetic member 41 which produces a resisting eddy current. This phenomenon results in dynamic damping of the motion of the tone arm 33 in both its radial travel across the record and any quick movements of the stylus caused by the vibrations or other phenomenon on the record. One such conventional material of which member 41 can be made is, of course, copper.

In the preferred embodiment, coils 43–45 are essentially flat coils wound about a common non-magnetic conducting core 41 which is held stationary relative to the motion of the member 30 along the member 25 and also remains stationary relative to the vertical pivotal motion of the member 30 and thus the tone arm 33. It should be noted that the preferred pivot point of the tone arm lies in the plane coincident with the plane of the lower record surface such that the vertical motion of the stylus tip is perpendicular to the record surface at this point. This prevents distortion due to changes in the relative velocity of record and stylus tip caused by vertical motion in the playing of a record. The system should be constructed such that the relative distance between the magnets 39 and 40 and the member 41, and thus the coils, remains relatively constant during both lateral and pivotal displacement of the tone arm.

While the preferred embodiment, is illustrated, other embodiments would be quite functional. For example, the magnets 39 and 40 could also be electromagnets and the relative positions of the magnets and the coils could be switched such that the magnets remain stationary and the coils themselves move as the phenomenon is based on the relative motion of the two rather than the particular placement of the components. In fact, the use of electromagnets in place of the permanent magnets would allow additional variation in the force producing effects and in the eddy current damping effect of the system which might prove desirable under certain circumstances.

Because the relative motion of the electromagnetic flux producing elements 39 and 40 and the coils 43–45 also produces an electric voltage in the coils in a well known fashion, an additional voltage sensing device as at 76 may be placed in the circuit of the coil 43 by the passage of the magnets past that coil as the tone arm increases its linear speed upon reaching the leadout grooves. In conjunction with the leadout groove sensing, sensor 76, it should be noted that while a certain amount of voltage will be produced during the normal playing of the record, the amount of voltage is velocity-dependent and will therefore increase as the speed of the lateral motion increases when the tone arm encounters the leadout grooves. Thus, when such voltage reaches a preset minimum value above that generated during the normal playing of the record, it can be utilized to perform a desired function such as automatically shutting off the phonograph after a record has finished playing.

To accomplish this a switch 77 may be ganged with switch 58 as at 78 such that when switch 58 is in position A, the coil 43 is connected to the sensing device 76 as by conductor 79. The sensing device 76 may be any device which passes a voltage above a certain minimum threshold desired to create a signal. The signal is passed through an amplifier 80 and operates a relay 81 which, in turn, opens normally closed contacts 82. This, of course, causes the "on" switch relay 56 to be de-energized allowing contacts 56a to open shutting off the main power supply to the unit. At this point the coil 45 also is de-energized and the stylus drops away from contact with the record surface allowing the record to be removed without fear of scratching.

From the above description, it is apparent that the control system of the present invention provides complete, repeatable control of a linear travelling, low-friction tone arm and a unique, straight-forward manner. It will be appreciated that the system can be adapted as well to a low friction tone arm which is designed to play the topside rather than the lower side of a phonograph record in which the coil 45 is used to provide a downward force to the stylus rather than upward as in the preferred embodiment.

It will be appreciated that the control system of the present invention accomplishes complete control where necessary and yet allows the complete freedom of the essentially frictionless tone arm to move radially uninhibited when playing the record thus taking full advantage of the ability of the tone arm to play the record radially in an essentially frictionless manner without skating and drag and other undesirable effects associated with the use of conventional pivoting tone arms. At the same time stylus pressure is adjustably controlled and the system appropriately damped.

The system also represents component cost reduction when compared to other, more complicated compensation systems which have been devised for both radial and conventional pivotal tone arms. The system is relatively uncomplicated and easily implemented. It does not require any complicated feedback systems to accomplish tone arm control.

As previously mentioned, while the preferred embodiment is one in which the underside of the record is played, the system easily adapts to a low friction, straightline top playing system.

The embodiments of the invention in which an exclusive property or right is claimed are defined as follows:

1. An apparatus for reproducing sound recordings from phonograph records comprising:
   a tone arm supported on low-friction bearing system defining a substantially linear path along which said tone arm enjoys free essentially frictionless linear travel, said tone arm also being free to pivot vertically in an essentially frictionless manner;
   a pickup carried by said tone arm such that linear travel of said tone arm products a corresponding linear radial displacement of said pickup relative to a phonograph record to be played and vertical pivoting of said tone arm produces corresponding essentially vertical displacement of said pickup;
   position control means for controlling the linear position of said tone arm, including positioning electromagnetic force producing means for applying a force to said tone arm in either direction along said linear path and positioning force modulating means for balancing said electromagnetic force in a manner which allows reproducible positive positioning of said tone arm at any point along said path wherein said electromagnetic force producing means comprises:
      a pair of spaced magnetic field producing means defining a gap therebetween,
      coil means disposed in said gap along and parallel to the path of said tone arm, said coil means having an increasing electromagnetic interaction with said magnetic field producing means toward each of the two ends of said path and wherein the linear travel of said tone arm produces a relative motion between said coil means and said magnetic field producing means
   wherein said positioning force modulating means comprises:
      adjustable current distribution means for proportioning electric current in said coil means such that the opposing linear forces produced thereby can be balanced at any point along said path to repeatably position said tone arm wherever desired
   pivot control means for controlling the vertical pivoting of said tone arm comprising:
      pivoting electromagnetic force producing means for applying a force to said tone arm to produce a vertical pivot thereof;
      pivoting force modulating means for controlling said vertical pivot including the pressure of said stylus on said record;
   means for supplying electrical current to said position and pivot control means.

2. The apparatus of claim 1 wherein said position control means in the unmodulated condition produces an unbalanced force on said tone arm tending to drive said tone arm to one extreme of said bearing system.

3. The apparatus of claim 2 wherein the imbalance in said unbalanced force is created magnetically.

4. The apparatus of claim 2 wherein said linear path deviates somewhat from the horizontal and the imbalance in said unbalanced force is gravitational.

5. The apparatus of claim 1 further comprising switching means for preventing the simultaneous operation of said position control means and said pivot control means, said switching means further comprising:
   first delay means allowing said pickup means to engage a record groove after said pivot control means is energized before said position control means is de-energized; and
   second delay means for allowing said pickup to clear said record groove after said pivot control means is de-energized before said position control means can be energized.

6. The apparatus of claim 1 wherein said magnetic field producing means are permanent magnets positioned with opposite poles adjacent.

7. The apparatus of claim 1 further comprising counterbalancing means for said tone arm of a weight such that said tone arm does not contact a record to be played when said pivot control means is not energized.

8. The apparatus of claim 1 wherein said tone arm means and support means are such that said pickup means addresses the underside of a phonograph record.

9. The apparatus of claim 1 wherein said coil means comprises first and second coil means said first coil means having an increasing turn density toward one end of said tone arm path and said second coil means has an increasing turn density toward the other end of said tone arm path.

10. The apparatus of claim 9 wherein said first and second coil means are essentially elongated and flat in shape.

11. The apparatus of claim 9 wherein said first and second coil means share a common core.

12. The apparatus of either of claims 1 or 9 wherein said adjustable current distribution means comprises variable resistance means.

13. The apparatus of claim 9 wherein said adjustable current dividing means further comprises readout means indicative of the relative current in said coils.

14. The apparatus of either of claims 1 or 9 further comprising voltage sensing means for sensing the velocity-dependent voltage generated in said first and second coil means wherein said voltage sensing means detects an increase in said voltage due to the increase in velocity of said tone arm upon reaching the lead out grooves of a phonograph record being played.

15. The apparatus of claim 1 wherein said pair of magnetic field producing means are carried by said tone arm and said first and second coil means are disposed along and parallel to the path of said tone arm in spaced relation to said pair of magnetic field producing means and substantially within said gap therebetween.

16. The apparatus of claim 1 further comprising damping means for damping the motion of said tone arm.

17. The apparatus of claim 16 wherein said damping means further comprises an electrically conductive member positioned in said gap between said pair of magnetic field producing means.

18. The apparatus of claim 16 wherein said electrically conductive member is copper.

19. The apparatus of claim 17 wherein said electrically conductive member is essentially in the shape of an elongated flat plate and forms a common core for said first and said second coils.

20. The apparatus of claim 1 wherein said pair of magnetic field producing means are electromagnets and including means for varying the current thereto.

21. The apparatus of claim 1 wherein said pivoting electromagnetic force producing means of said pivot control means further comprises:
- a pair of spaced magnetic field producing means defining a gap therebetween;
- pivot coil means disposed in said gap along and parallel to said path of said tone arm;

and wherein said pivoting force modulating means of said pivot control means further comprises means for modulating an electrical current in said pivot coil means.

22. The apparatus of claim 21 wherein said pivot coil means has a changing vertical turn density.

23. The apparatus of claim 21 wherein said pivoting force modulating means further comprises variable resistance means.

24. The apparatus of claim 21 further comprising meter means for reading the amount of current in said pivot coil.

25. The apparatus of claim 24 wherein said meter means readout is adjusted to read stylus pressure on a record.

26. The apparatus of claim 25 further comprising damping means for damping the motion of said tone arm.

27. An apparatus for reproducing sound recordings from phonograph records comprising:
- a tone arm supported on an essentially frictionless bearing system defining a substantially linear, horizontal path along which said tone arm enjoys free, essentially frictionless linear travel, said tone arms also being free to pivot vertically in an essentially frictionless manner;
- a pickup carried by said tone arm such that linear travel of said tone arm produces a corresponding linear radial displacement of said pickup relative to a phonograph record to be played and vertical pivoting of said tone arm produces corresponding essentially vertical displacement of said pickup;
- position control means for controlling the horizontal linear position of said tone arm, said position control means further comprising:
  - a pair of spaced magnetic field producing means defining a gap therebetween;
  - first and second coil means disposed in said gap along and parallel to said path of said tone arm wherein each of said coils has an increasing turn density toward a different one of the two ends of said path and wherein the linear travel of said tone arm produces a relative motion between said first and second coils and said magnetic field producing means;
  - adjustable current dividing means for proportioning an electric current between said first and said second coils such that the opposing linear forces produced by said first and said second coils associated with said magnetic field producing means can be balanced at any point along said path to repeatably position said tone arm wherever desired;
- pivot control means for controlling the vertical pivoting of said tone arm comprising:
  - pivot coil means disposed in said gap between said spaced magnetic field producing means along and parallel to said path of said tone arm; and
  - means for modulating an electric current in said pivot coil means; and
  - means for supplying an electric current to said position and pivot control means.

28. The apparatus of claim 27 wherein said first and second coil means of said position control means and said pivot coil means are essentially elongated and flat in shape and all said coil means share a common core.

29. The apparatus of claim 28 wherein said pair of magnetic field producing means are carried out by said tone arm and said position coil means and said pivot coil means are disposed along and parallel to the path of said tone arm in spaced relation to said pair of magnetic field producing means and substantially within said gap therebetween.

30. The apparatus of claim 28 further comprising damping means for damping the motion of said tone arm.

31. The apparatus of claim 30 wherein said damping means further comprises an electrically conductive member positioned in said gap between said pair of magnetic field producing means.

32. The apparatus of claim 31 wherein said electrically conductive member is essentially in the shape of an elongated flat plate and forms a common core for said position control coils and said pivot coil.

33. The apparatus of claim 27 wherein said pair of magnetic field producing means are permanent magnet disposed with opposite poles adjacent.

34. The apparatus of claim 27 wherein said pair of magnetic field producing means are electromagnetic and including means for varying the current thereto.

35. The apparatus of claim 27 further comprising switching means for preventing the simultaneous operation of said position control means and said pivot control means, said switching means further comprising:
- first delay means allowing said pickup means to engage a record groove after said pivot control means is energized before said position control means is de-energized; and
- second delay means for allowing said pickup to clear said record groove after said pivot control means is de-energized before said position control means can be energized.

36. The apparatus of claim 27 further comprising static counterbalancing means for said tone arm of a weight such that said tone arm does not contact a record to be played when said pivot control means is not energized.

* * * * *